United States Patent
Peitz et al.

(10) Patent No.: US 11,596,045 B2
(45) Date of Patent: Feb. 28, 2023

(54) LIGHT DEVICE WITH BEACON FOR POSITIONING

(71) Applicant: OSRAM GmbH, Munich (DE)

(72) Inventors: Christoph Peitz, Lippstadt (DE); Andrej Wallwitz, Munich (DE); Karl-Heinz Wallwitz, Munich (DE); Andreas Zaggl, Munich (DE); Michel Stutz, Munich (DE); Henry Feil, Unterhaching (DE)

(73) Assignee: OSRAM GmbH, Munich (DE)

( * ) Notice: Subject to any disclaimer, the term of this patent is extended or adjusted under 35 U.S.C. 154(b) by 60 days.

(21) Appl. No.: 17/044,331

(22) PCT Filed: Mar. 21, 2019

(86) PCT No.: PCT/EP2019/057155
§ 371 (c)(1),
(2) Date: Oct. 1, 2020

(87) PCT Pub. No.: WO2019/192855
PCT Pub. Date: Oct. 10, 2019

(65) Prior Publication Data
US 2021/0160993 A1    May 27, 2021

(30) Foreign Application Priority Data

Apr. 4, 2018 (DE) .......................... 10201807921.4

(51) Int. Cl.
*H05B 47/19* (2020.01)
*G01S 1/04* (2006.01)
*H01Q 1/44* (2006.01)
(Continued)

(52) U.S. Cl.
CPC ............ *H05B 47/19* (2020.01); *G01S 1/0426* (2019.08); *G01S 1/0428* (2019.08); *G01S 5/0295* (2020.05);
(Continued)

(58) Field of Classification Search
CPC .... G01S 1/0426; G01S 1/0428; G01S 13/003; G01S 13/34; G01S 13/46; G01S 13/86;
(Continued)

(56) References Cited

U.S. PATENT DOCUMENTS

2012/0013509 A1    1/2012    Wisherd et al.
2013/0065584 A1*   3/2013    Lyon ....................... H04W 4/80
                                                              455/434

(Continued)

FOREIGN PATENT DOCUMENTS

DE    102016104485 A1    9/2017

OTHER PUBLICATIONS

International Search Report issued in the corresponding international application No. PCT/EP2019/057155, dated Aug. 4, 2019, 21 pages (reference purposes only).
(Continued)

*Primary Examiner* — Monica C King
(74) *Attorney, Agent, or Firm* — Viering, Jentschura & Partner MBB

(57) ABSTRACT

A system and a method for operating a lighting device may include a transmission device and an optional communication unit. The transmission device may be configured to wirelessly transmit a radio signal with identification data specific to the transmission device of the lighting device via at least two radio channels. The transmitted radio signal transmitted via a respective one of the at least two channels may include channel data with respect to the respective one
(Continued)

of the radio channels. In a non-limiting embodiment, the transmission device is a beacon.

19 Claims, 1 Drawing Sheet

(51) Int. Cl.
  *H04W 52/16* (2009.01)
  *H04W 72/04* (2009.01)
  *G01S 5/02* (2010.01)
  *H04W 72/0446* (2023.01)

(52) U.S. Cl.
  CPC .............. *H01Q 1/44* (2013.01); *H04W 52/16* (2013.01); *H04W 72/048* (2013.01); *H04W 72/0446* (2013.01)

(58) Field of Classification Search
  CPC ...... G01S 13/88; G01S 2013/462; G01S 5/14; G01S 5/18; G01S 7/006; G01S 7/2883; G01S 7/415; G01S 7/417; H01Q 1/44; H04B 17/27; H04B 17/318; H04B 17/3913; H04W 16/225; H04W 4/02; H04W 4/021; H04W 4/80; H04W 52/16; H04W 72/0446; H04W 72/048; H04W 72/14; H05B 47/19; H04L 1/189; H04L 1/08; H04L 1/1819; H04L 1/1896
  See application file for complete search history.

(56) References Cited

U.S. PATENT DOCUMENTS

| | | | |
|---|---|---|---|
| 2015/0119068 | A1 | 4/2015 | Kudekar et al. |
| 2015/0289207 | A1 | 10/2015 | Kubo et al. |
| 2015/0304822 | A1 | 10/2015 | Han et al. |
| 2015/0334677 | A1 | 11/2015 | Patil et al. |
| 2016/0105761 | A1 | 4/2016 | Polo et al. |
| 2017/0111980 | A1 | 4/2017 | Bátai et al. |
| 2017/0134145 | A1 | 5/2017 | Xin et al. |
| 2021/0036807 | A1* | 2/2021 | Iwai .......................... H04L 1/08 |
| 2022/0026531 | A1* | 1/2022 | Wu ........................ H04W 4/021 |

OTHER PUBLICATIONS

Office Action issued in the corresponding German application No. 102018107921.4, dated on Nov. 30, 2018, 8 pages (reference purposes only).

* cited by examiner

LIGHT DEVICE WITH BEACON FOR POSITIONING

CROSS-REFERENCE TO RELATED APPLICATIONS

The present application is a national stage entry according to 35 U.S.C. § 371 of PCT application No.: PCT/EP2019/057155 filed on Mar. 21, 2019; which claims priority to German Patent Application Serial No.: 10 2018 107 921.4 filed on Apr. 4, 2018; all of which are incorporated herein by reference in their entirety and for all purposes.

TECHNICAL FIELD

Devices and methods for operating a transmission device wirelessly transmitting a radio signal with identification data specific to the transmission device via at least two radio channels are disclosed. Further, a system with a transmission device and a communication unit is also disclosed that relates to a lighting device.

BACKGROUND

Methods, systems, transmission devices, communication units as well as lighting devices of the generic type are fundamentally extensively known in the prior art such that a separate printed evidence is not required hereto. Rooms, for example outside or also within buildings, are illuminated by lighting devices in presettable manner to allow or support an intended use. Lighting devices are increasingly employed, which besides the intended function of light emission also comprise a transmission device, which is at least formed to wirelessly transmit specific identification data, for example in the manner of broadcast. In a non-limiting embodiment, this transmission device is formed to transmit the radio signal in the manner of near field radio. Such a transmission device is also referred to as "beacon" in the prior art.

SUMMARY

So-called beacons can be combined with lighting devices to be able to provide lamp-specific or also other information by means of their radio signal. The beacon technology is based on a transmitter system or on a transmitter-receiver system. A beacon (also Leuchtfeuer, Barke, Peilsender or the like in German) is a small, mostly battery-operated transmitter, which transmits a radio signal, in definable time intervals, for example based on a Bluetooth Low Energy standard (BLE), ZigBee or the like.

The radio signal of a beacon is characterized by the identification data, which for example includes a unique identification number, also called Universally Unique Identifier (UUID) in English. Beacons can be used to associate an, in particular digital, identification to objects and/or locations. Objects, at which a beacon is installed, as well as also locations, at which a beacon is installed, for example on a wall or on a ceiling, can be identified by communication units, in particular communication terminals, for example smart phones, laptops and/or the like, in the signal field of the beacon in this manner.

In this manner, with the aid of the beacon, a location can for example be identified and a localization can be performed, respectively. By arranging one or more beacons in a preset area, for example a building area or the like, a type of radio-based raster can be provided, which allows a communication unit located in this area to be able to ascertain an own position by means of its radio interface, in particular a BLE interface, as well as corresponding evaluation possibilities.

Therein, the individual identification data of the installed beacons associates an identifier to a respective location, based on which the communication unit can, at least approximately, ascertain its position. Basically, a communication range of a respective beacon can be ascertained in any case.

By suitable evaluation, for example using preset algorithms or the like, the accuracy of the ascertained position, for example by evaluating a signal strength of the radio signal and/or the like, can be improved. Hereto, the communication unit can access data of a data storage, for example via a separate communication network like the Internet, a mobile radio network and/or the like. The data storage can for example be a Cloud server or the like. Here, the identification data and associated position data can for example be registered in a corresponding database in the manner of map data.

If the communication unit comes in communication range to the transmission device or the beacon, the communication unit can thus ascertain the own site based on the ascertained identification data for example via server query. Using further radio signals of further transmission devices or beacons, the accuracy can be further improved by means of localization algorithms, in particular, from a reception field strength of a respective one of the radio signals of the transmission devices or the beacons, a distance to the respective transmission devices or to the respective beacon can be ascertained.

Basically, transmission devices or beacons can be installed at lighting devices in illumination systems in the lighting technology. Therein, the advantage is in particular utilized that a light installation can provide a permanent energy access to be able to supply the transmission device or the beacon with electrical energy. Therefrom, the advantage results that the transmission device or the beacon does not have to comprise an own energy supply in the form of a battery or the like and thus a corresponding maintenance effort can be at least partially avoided. Moreover, this configuration allows that settings of the transmission device or the beacon can also be selected, which can entail a high energy consumption without this having to have effects on an operating duration of the transmission device or the beacon. Moreover, installation processes of such transmission devices or beacons and of the lighting technology can be unified. A further advantage is a defined locking position of the transmission device or the beacon, which is selected such that the transmission device or the beacon is protected from manipulation. Thereby, a reliably secure identifier can be associated with a location.

An overview over use potentials of the integration of a transmission device or a beacon in a lighting device is apparent from the following non-conclusive enumeration:

The energy supply of the light installation can be used instead of an energy supply by a battery to for example reduce lifecycle cost of the transmission device or the beacon.

The electrical energy supply of the illumination system or of the lighting device can be used to adapt transmission parameters of the signal of the transmission device or the beacon to the service and not to an available residual amount of energy and parameters of the battery, respectively. Frequent transmission cycles for example generate a high accuracy of a respective service, but this can also result in increased energy consumption.

The exchange of the battery of conventional transmission devices or beacons bears risks, namely for example with regard to errors in the handling.

A non-availability of services can be avoided by an uninterrupted energy supply of the transmission device or the beacon.

An installation location below a ceiling can be advantageous for a signal propagation of the signal of the transmission device or the beacon.

An installation location below the ceiling can make the overall system more robust against disturbances and shadings, respectively, by other objects at the level of a floor level in contrast to an installation of the transmission device or the beacon itself at the level of the floor level.

The transmission device or the beacon can be protected from manipulations and unauthorized accesses, respectively—whether unintentional or intentional.

The illumination system as well as also services such as for example localization services or the like can be offered as an overall system "from a single source".

Moreover, there is the possibility of using a secure communication network of the illumination system to for example configure the transmission device or the beacon or to link the transmission devices or the beacons with each other.

A unification of installation processes of transmission devices or beacons and of the illumination system can be allowed.

Furthermore, there is the possibility of coupling to further system elements of a peripheral building infrastructure via the communication network of the illumination system, for example to elements of the safety technology and/or the like.

An optically attractive illumination system can be provided since the transmission device or the beacon can be non-visibly arranged in the respective lighting device or in the illumination system.

A beacon can be integrated in the lighting device as a transmission device. Then, the lighting device also includes one or more illuminants besides the beacon or the transmission device, to be able to provide the desired illumination function. In a non-limiting embodiment, the beacon or the transmission device on the one hand and the lighting device on the other hand can be in communication link with each other. The beacon or the transmission device is optionally arranged integrated in the lighting device, in particular in a common housing. Thus, a separate housing does not have to be provided for the beacon or the transmission device. Thereby, the beacon or the transmission device can be arranged protected at the same time such that the intended function can be provided with high reliability.

The beacon or the transmission device is formed to wirelessly transmit the radio signal with the identification data specific to the beacon or the transmission device. In a non-limiting embodiment, the transmission is effected by radio using the BLE standard. The beacon or the transmission device further optionally includes a control unit, which can include a computer unit as well as a storage unit. In the storage unit, an executable computer program can be stored, which is available for the computer unit such that a preset control functionality can be realized by means of the computer unit, in particular also with respect to the transmission of the radio signal.

The beacon or the transmission device can further be in communication link with further local beacons or transmission devices. The communication link can also be formed as a wireless communication link, also according to the BLE standard. However, a wired communication link can also be provided. The communication link between the beacon or the transmission device and the further beacons or transmission devices is optionally bidirectional such that signals, in particular data, can be exchanged.

Moreover, the transmission device or the beacon can be connected to a data infrastructure device via a further communication link. The data infrastructure device can serve for controlling a system of a plurality of lighting devices. The data infrastructure device can for example at least partially also include the Internet, a center, in particular also a central service server and/or the like. The data infrastructure device can further serve for controlling and/or communicating data.

The beacon or the transmission device can be formed as a pure transmission device for transmitting radio signals in the manner of broadcast or else as a combined transmission-reception device, which also allows a reception of radio signals besides the transmission of radio signals in the manner of a broadcast operation or even allows a bidirectional communication with the communication unit. The radio signal of the transmission device or of the beacon can be received by means of the communication unit.

According to an example of use, users and appliances, respectively, can optionally have the challenge to have to orient themselves, to navigate or to locate or intend to use other local digital services within a region, such as for example apps, app functions, Google Maps, Lightify, light control and/or the like. The illumination system with integrated beacons in a preset region can become a localization and orientation system, respectively, for these potentials of use. With a self-localization of the communication unit realizable thereby, services can now be provided, for example a navigation, provision of location-specific information, services and/or the like.

An aspect of the beacon technology is the possibility of configuration of typical parameters such as for example a signal strength, a transmission interval and/or the like of the beacon. With different configurations, different scenarios of application can be individually supported. For example, if a high service quality with respect to an accurate localization in short intervals is desired, for example in indoor navigation, very short transmission intervals can for example have to be configured.

In particular in digitally controlled illumination systems, for example using Digital Addressable Lighting Interfaces (DALI), it should be possible to uniquely identify, which illuminant or which lighting device is arranged at which location, to allow an exact control of the lighting devices or the illuminants thereof in a certain region by means of digital light control. Hereto, the lighting devices require a unique address, which reflects their position in a preset region. The expert terms such an association of lighting devices with corresponding positions or addresses as "commissioning". Herein, multiple information should be combined, namely unique identification information of a respective lighting device, such as in the manner of unique specific identification data, an installation location of the respective lighting device in a preset region, that is a physical address of the lighting device, as well as an identifier of the lighting device, that is for example its digital address.

The digital address of a lighting device can for example be communicated to a control or data processing via a power line communication or a similar power-based communication solution via the energy distribution. The lighting device or a ballast of the lighting device can thus sign up at the control with the digital address. However, the information, at which physical location in the preset region the lighting device is actually arranged, is thereby not yet available. However, this information is required if only a defined region is to be illuminated, for example only a conference room or a part thereof or the like.

At present, lighting devices or illuminants and at the same time the site thereof usually cannot be readily electronically identified. Typically, it can only be recognized via a label or an impressing, for example on a housing of the lighting device, which type of the lighting device or the illuminant it is. Another expensive possibility is in causing each digitally signed up lighting device within the scope of the illumination system to individually blink and in manually marking position information in a layout.

In order to efficiently connect lighting devices and/or illuminants within the scope of the illumination system to a light management system (LMS), it would be advantageous to have available one or more electronic and digital identification numbers, respectively, for recognizing the overall system or individual components of the overall system.

Further, a specific problem is in that positions of the lighting devices or illuminants are usually set in an installation plan for an illumination region and service region, respectively. This presets to an installer, which of the delivered and commissioned lighting devices, respectively, for example with respect to a lamp type or the like, are to be arranged in which position of the region, for example the building, corresponding to the installation plan.

Location-related services and services such as for example navigation of a user or the like, respectively, by means of beacons should be available to the user in a preset region in permanent manner and without restriction. Besides an uninterrupted electrical energy supply, this also requires regular maintenance and optionally also update of computer programs such as for example the firmware or the like, respectively.

Services using a beacon, such as for example a navigation by means of a communication unit, should be available to the users in permanent manner and without restriction if possible. Among other things, this requires an uninterrupted energy supply for the beacons. Nevertheless, it has turned out to be an impediment that communication terminals are usually formed for a preset, in particular proprietary, communication protocol. The communication protocols, which are employed in the meantime, are usually based on the BLE standard as the radio standard. Depending on the respective communication protocol specific to communication terminal, the communication terminals partially respond quite differently. A beacon protocol established therein is for example the "iBeacon" Protocol® of the company Apple Inc. Communication terminals based on the operating system iOS® of the company Apple Inc. can for example receive and process a radio signal according to the iBeacon Protocol®. Moreover, further such beacon protocols are known, thus for example "Eddiestone"® of the company Google or the beacon protocol "AltBeacon", which is an open source protocol. In order to be able to allow an application of the beacon technology as wide as possible, it can thus be required to employ multiple beacon protocols in parallel. This increases the problem for the production of the beacons, in particular with regard to the energy supply thereof as well as the possible reliable provision of a respective service and the like. Of course, there is the possibility to provide an own, adapted beacon for each beacon protocol. However, this proves to be expensive, in particular with respect to the energy supply and/or constructive aspects, which relate to the spatial arrangement of the beacon. Moreover, the number of the specific identification data would be correspondingly increased.

For example, if an operator of a supermarket wishes to ensure that the offered services such as for example a navigation of a customer through the supermarket or the like are available for each customer with any communication unit in unrestricted manner, adapted beacons would have to be installed corresponding to the possible communication units specific to manufacturer and specific to operating system, respectively. However, this results in the fact that for example with two beacon protocols, at least twice as many beacons would have to be installed. Thereby, high investment cost, high lifecycle cost due to a respective battery exchange, a high installation effort as well as also a high equipment effort for setting a respective beacon protocol and the like result. Moreover, problems in the signal processing by the communication units can also arise if the different beacons are for example not matched to each other or the like with regard to a transmission point of time or a radio signal strength or the like.

In order to be able to realize the localization functionality using transmission devices or beacons, it can be provided that a distance of the communication unit to a respective one of the transmission devices or beacons is ascertained. For example using trilateration or the like, a position of the communication unit can be ascertained. In order to be able to ascertain a respective distance, the communication unit uses signal properties of the respectively received radio signal as well as the reference data contained in the respective radio signal. With the reference data, it is possible to ascertain the distance to the respective transmission device or to the respective beacon based on the signal properties, which have been ascertained based on the received radio signal.

However, the practice has shown that the ascertainment of the distance by the communication unit is subjected to inaccuracies. Thus, it proves to be problematic on the one hand that the transmission devices or the beacons usually use multiple radio channels to transmit their respective radio signal. Therein, it has been shown that the transmission power of the radio signal, which is emitted by the transmission device or the beacon, is not uniform in the respective radio channels and therefore can rather deviate from each other with respect to the radio channels. Moreover, a mounting location of the transmission device or the beacon can also make itself noticeable as disturbing in that for example reflections can be generated, the radio signal is attenuated and/or the like. Besides further influences, this can result in partially large deviations in ascertaining the distance between the transmission device or the beacon on the one hand and the communication unit on the other hand. Therein, it proves to be disadvantageous that the transmission device or the beacon is already adjusted to preset values on the side of production. Thus, calibration occurs at most only once during the production process. Data, by means of which information with respect to the radio signal can be provided, is usually not provided.

Therefore, the operation of the transmission device or the beacon may be improved, in particular in combination in a system with the communication unit.

Advantageous developments are apparent based on features of the dependent claims.

With respect to a generic method for operating a transmission device, it is in particular proposed according to a first aspect that the radio signal transmitted via the respective one of the at least two radio channels contains channel data with respect to this respective one of the at least two radio channels.

With respect to a generic method for operating a transmission device, it is in particular proposed according to a second aspect that a transmission power of the radio signal transmitted via the respective one of the at least two radio channels is adjusted depending on the transmission properties of the respective radio channel.

With respect to a generic method for operating a communication unit, it is in particular proposed according to the first aspect that channel data with respect to the respective radio channel is ascertained from the radio signal and the evaluation is effected depending on the channel data.

With respect to a generic method for operating a communication unit, it is in particular proposed according to the second aspect that the radio signal is channel-selectively received and evaluated depending on the selected radio channel.

With respect to a generic method for operating a transmission device in connection with a communication unit, it is in particular proposed that the transmission device transmits the radio signal transmitted via the respective one of the at least two radio channels with channel data with respect to this respective one of the at least two radio channels and/or a transmission power of the radio signal transmitted via the respective one of the at least two radio channels is adjusted depending on transmission properties of the respective radio channel.

With respect to a generic transmission device, it is in particular proposed according to the first aspect that the transmission device is formed to transmit the radio signal to be transmitted via the respective one of the at least two radio channels with channel data with respect to this respective one of the at least two radio channels.

With respect to a generic transmission device, it is in particular proposed according to the second aspect that the transmission device is formed to adjust a transmission power of the radio signal to be transmitted via the respective one of the at least two radio channels depending on transmission properties of the respective radio channel.

With respect to a generic communication unit, it is in particular proposed that the communication unit is formed to ascertain channel data with respect to the respective radio channel from the radio signal and to perform the evaluation depending on the channel data and/or to channel-selectively receive the radio signal and to perform the evaluation depending on the transmission properties of the selected radio channel.

On the system side, it is in particular proposed for a generic system that the system includes a transmission device and a communication unit.

With respect to a generic lighting device, it is in particular proposed that the lighting device comprises a transmission device of the system.

The specific identification data by the communication unit can be considerably improved if information or data is available, which relates to the transmission properties of the respective radio channel. This information or data can be made available in that for example according to the first aspect the radio signal transmitted by the transmission device additionally contains channel data with respect to the respective one of the at least two radio channels, via which the radio signal was transmitted, besides the specific identification data. This considers that this information is usually not present in the communication unit in the prior art. Such data is for example usually not transmitted in the Bluetooth standard. Therefore, the communication unit can only receive the radio signal as such and ascertain the data contained in the radio signal. Usually, it cannot be ascertained on the side of the communication unit, on which frequency the radio signal is transmitted and via which radio channel the radio signal is transmitted, respectively.

In that the channel data is now available on the communication unit side, this can be considered on the communication unit side in the evaluation of the radio signal.

Thereby, transmission properties of the radio channel can in particular be considered such that the evaluation can overall be more accurately effected. This particularly advantageously affects the ascertainment of the distance between the communication unit and the transmission device or the beacon if this is effected using a reception field strength of the radio signal.

Moreover, the information or data with respect to the respective one of the radio channels can also be used on the transmission device side to adjust a transmission power of the radio signal transmitted via the respective one of the at least two radio channels depending on the transmission properties of the respective radio channel. Thereby, deviations of transmission properties specific to radio channel can be at least partially compensated for on the transmission device side such that a corresponding supplemented evaluation is simplified if it cannot even be omitted on the communication unit side. Thus, on the communication unit side, it does no longer have to be dependent on which radio channel the radio signal is received, namely, because the respective transmitter power can be adjusted on the transmission device side such that the evaluation can be equally reliably realized in the communication unit substantially independently of the respectively selected channel for the communication of the radio signal.

Fundamentally, these two aspects can of course also be combined with each other, for example if a preset number of radio channels is selected with respect to their transmission properties such that they have substantially identical transmission properties and thus can be treated as a group of similar radio channels.

The transmission properties of the radio channel can include an attenuation, a bandwidth, interferences, modulation methods, selected carrier frequencies and/or the like among other things. In a non-limiting embodiment, the transmission properties include such data, which is suitable to allow and improve, respectively, an adaptation with respect to the transmission and/or reception and evaluation of the radio signal such that the intended functionality can be ensured by evaluating the radio signal on the communication unit side. For this purpose, the transmission properties can for example include attenuation values, frequency bands, center frequencies, interfering transmitters and/or the like. The transmission properties can be at least partially provided as transmission data.

Thereby, particular assembly-specific and/or construction-specific peculiarities can be considered, which can in particular unevenly affect the radio channels and thereby impair the accuracy of the evaluation by the communication unit.

A possibility of being able to more specifically consider the channel-specific peculiarities of a respective one of the radio channels is opened up such that the evaluation of the radio signal on the side of the communication unit can overall be improved. This particularly advantageously has an effect in the distance ascertainment based on the radio signal between the communication unit and the transmission device or the beacon. The transmission properties of the respective radio channel can be stored in the transmission device and/or in the communication unit as transmission data. Moreover, this transmission properties can of course also be retrieved from a database, for example a center or a central server, by the communication unit and/or the transmission device via a suitable communication link, via which the transmission device or the beacon and the communication unit, respectively, is in communication link with the center or the central server. In a non-limiting embodiment, this communication link can be a wireless communication link.

The radio signal as such, which can usually be provided for example by a carrier signal, can thus be transmitted adapted specific to radio channel for example with respect to the transmission power for the correspondingly selected radio channel and/or contain corresponding channel data, which allows on the communication unit side to be able to ascertain the selected radio channel. For this purpose, the channel data can be modulated onto the radio signal by means of a suitable modulation, with the same modulation, with which the specific identification data is also modulated onto the radio signal. Thereby, an adaptation of the transmission device or the beacon to local circumstances can for example be avoided, wherein the evaluation of the radio signal on the side of the communication unit can remain largely unimpaired at the same time. Further, it is of course possible that a transmission power is correspondingly adapted on the transmission device side using the specific transmission data representing the transmission properties such that a compensation can be achieved at the communication unit on the reception side. For the communication unit, thus, it can be achieved that it can reliably execute its evaluation independently of the channel, on which the radio signal is communicated.

Moreover, subsequent effects or variations of the radio channels may occur during the intended operation of the transmission device or the beacon, for example if constructional variations or the like are performed. Thereby, a retrofit or a reconstruction is also possible.

Thus, hardware-side variations at the transmission device or the beacon in particular with respect to the first aspect largely do not have to be performed. Only the channel data has to be modulated onto the radio signal in addition to the specific identification data such that the corresponding data is available on the communication unit side and can be used for evaluating the radio signal.

For example, the channel data can include a number of a radio channel, a carrier frequency and/or the like. Fundamentally, there is of course also the possibility that the channel data includes at least a part of the transmission properties of the respective channel, via which the radio signal is communicated. The channel data can in particular of course also include a respective channel-specific transmission power of the transmission device or the like. In a distance measurement, thus, a distance between the communication unit and the transmission device or the beacon can be ascertained from a reception field strength at the communication unit in an undisturbed case. Therein, it can be considered that the reception field strength can be dependent according to a preset characteristic of the different radio channels in the undisturbed case.

Disturbing influences can be better considered by adapting the transmission power and by communicating channel data, respectively. For example, if the radio signal is channel-specifically attenuated in undesired manner by constructional equipments or the like, this can be correspondingly considered by adapting the channel data and the transmission power, respectively. Thereby, it is possible on the communication unit side to considerably more accurately determine the actual distance between the communication unit and the transmission device or the beacon based on the radio signal optionally using the channel data. The corresponding transmission properties can be stored as transmission data in a storage unit of the transmission device or the beacon or also of the communication unit.

Moreover, specific properties with respect to the transmission and/or the reception of the radio signal may be considered, for example transmission properties of an antenna and/or the like. Especially the consideration of properties of a device's antenna unit on the transmission device side as well as a unit's antenna unit on the communication unit side can thereby be better taken into account. Usually, it is shown that the transmission properties of the antenna units can be dependent on the respective radio channel. In particular, this can have an effect if the radio channels are provided by different carrier frequencies. Even with the use of broadband antenna units, significant deviations with respect to the transmitted radio signal and the received radio signal, respectively, can occur here, which can result in undesired effects in evaluating the radio signal by the communication unit. There is the possibility to ascertain these undesired effects and to correspondingly evaluate them on the communication unit side and/or to consider them in transmitting the radio signal on the transmission device side.

A correction value can for example be ascertained using the channel data on the communication unit side according to the first aspect, which can serve to correspondingly more accurately realize the evaluation. In the simplest case, the channel data only includes a number of the used radio channel. For this purpose, the used radio channels can for example be standardized with respect to the numbering. Thereby, the corresponding detail information with respect to the radio channels is generally available. By the transmission of the number of the used radio channel, thus, the associated transmission properties of the respective radio channel can be ascertained in simple manner. The correction value can then be ascertained from these transmission properties.

The communication of the channel number can also be used in an already know communication standard like the Bluetooth standard or the like. The communication of the number of the radio channel can also be in that only a number related to a reference radio channel is communicated. The reference radio channel is previously set and is thus available on the transmission device side or beacon side and communication unit side, respectively. The communicated number of the radio channel can now relate to a consecutive numbering or the like, which numbers the radio channels starting from the reference radio channel. Other approaches for identification of the number of the radio channel can also be used hereto.

According to the second aspect, channel data does not have to be communicated, namely if the transmission device itself channel-specifically adapts its transmission power such that the evaluation of the communication unit can be ensured with great reliability independently of channel. For this purpose, it can be provided that the transmission device or the beacon comprises a transmission unit, which correspondingly adapts its power specific to radio channel for transmitting the radio signal via the respective one of the radio channels. Of course, it can also be provided that the transmission unit provides a corresponding transmission functionality hereto, such that the radio signal is transmitted substantially independently of channel with the same radio signal strength. For this purpose, corresponding filter circuits or the like can be provided in the transmission unit. Of course, a device's antenna unit of the transmission device or the beacon can also be correspondingly formed and have a corresponding characteristic. Combinations hereof can also be provided.

For evaluating the radio signal on the side of the communication unit, signal properties of the radio signal can be considered. Such signal properties can in particular include a reception field strength, an amplitude, a power, a frequency, a modulation method and/or the like.

Thus, the communication unit may perform the evaluation of the radio signal in improved manner.

According to an advantageous development, it is proposed that the specific identification data is dependent on the radio channel, on which the radio signal is transmitted. Thus, it can be provided that different identification data is associated with the transmission device specific to radio channel. Thus, the transmission device can have more than one identification. By the specific identification data, thus, the information with respect to the radio channel, via which the radio signal is transmitted, can be provided. Herein, it can be provided that the specific identification data is individual for each one of the radio channels. Of course, it can also be provided that the specific identification data is identical for two or more of the radio channels, for example if the transmission properties of these radio channels are substantially identical. Of course, groups of radio channels can also be formed, with which common specific identification data is associated. In a non-limiting embodiment, the radio channels of such a group have substantially identical transmission properties. However, this does not have to be imperatively provided. Moreover, it can be provided that the transmission power is correspondingly adapted for a group of radio channels such that a reliable evaluation of the radio channel can be ensured with respect to the communication unit on the reception side.

Further, it can be provided that the radio signal is transmitted offset in time on the respective one of the at least two radio channels. Rather, an identification possibility for the radio channel, via which the radio signal is transmitted, can also be achieved by offsetting the transmission of the radio signal in time with respect to the radio channels. For example, it can be provided that the radio signals are transmitted offset in time in a preset sequence via the radio channels. The transmission offset in time can be effected according to a preset pattern such that an identification of a respective one of the at least two radio channels can be achieved considering this pattern. In this development, the radio signal thus does not have to be simultaneously transmitted via the radio channels. The transmission of the radio signals offset in time can be cyclically repeated. In order to be able to ascertain a first one of the radio channels, it can be provided that a synchronization pause or the like is provided. In this manner, it can be achieved for the communication unit that the radio channel, via which the radio signal is transmitted, can be ascertained. Then, only the radio signals have to be correspondingly counted.

Moreover, there is of course the possibility that the radio signal is channel-selectively transmitted only on a selected one of the at least two radio channels. This development has the advantage that an adaptation is only required with respect to a single one of the radio channels. Thus, it can be provided that only channel data is communicated for the one radio channel. Correspondingly, it can also be provided that only the transmission power for this one radio channel is adjusted to a preset value, which is dependent on which transmission properties this radio channel has.

Further, it can be provided that the radio signal is channel-selectively received via a selected one of the at least two radio channels. In this development, the communication unit is formed to channel-selectively receive the radio signal. Thereby, the specific radio channel is known on the communication unit side, the radio signal of which is used for evaluation. In that the transmission properties are also known at the same time, for example also a transmission power of the transmission device, the evaluation of the radio signal can be particularly reliably realized. For this purpose, it can be provided that the communication unit comprises a suitable reception unit, which allows channel-selectively receiving the radio signal via a respective selected radio channel.

Further, it can be provided that the communication unit stores transmission data to transmission properties for the at least two radio channels. This can allow the communication unit to evaluate the radio signal in improved manner. The transmission data of the radio channels is thus immediately available to the communication unit. Moreover, it can of course be provided that the transmission data is provided and stored by the center or a central server via an optionally separate communication link. There is also the possibility of updating the transmission data during the intended operation. Thereby, higher reliability in the intended operation can be achieved.

With respect to a system, it is further proposed that the communication unit comprises a unit's antenna unit and the transmission device comprises a device's antenna unit, wherein the unit's antenna unit and the device's antenna unit are formed complementary to each other with respect to their radio-specific antenna properties. Thereby, it can be achieved that peculiarities specific to radio channel, which can be substantiated by one or both of the antenna units, can be compensated for. Thereby, the transmission properties or the corresponding transmission data can be reduced with respect to their amount.

The advantages and effects specified for the methods similarly apply to the devices, systems and lighting devices and vice versa. Insofar, device features can also be formulated for method features and vice versa.

BRIEF DESCRIPTION OF THE DRAWINGS

Further advantages and features are apparent from the following embodiments based on the attached figures. In the Figs., identical reference characters show identical features and functions.

DETAILED DESCRIPTION

Figure 1:
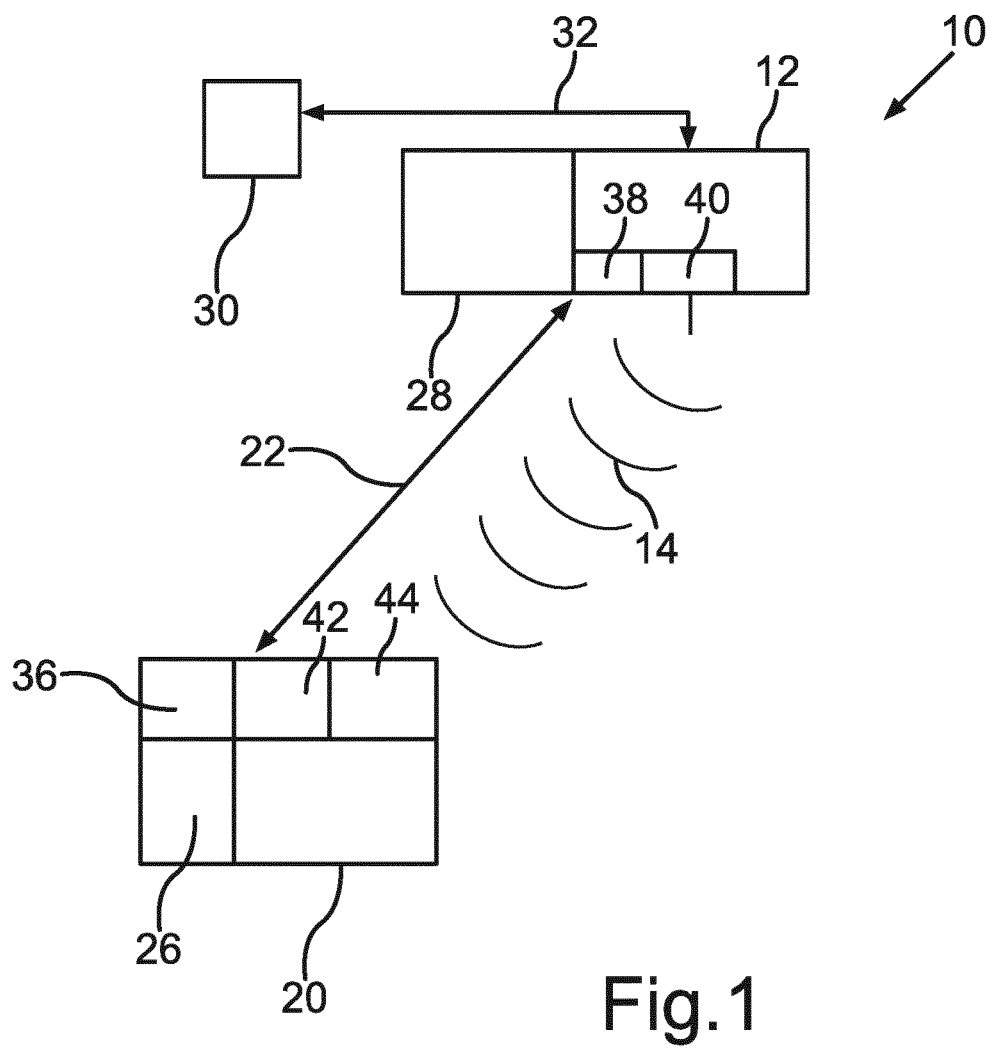
FIG. 1 depicts a system in a schematic block representation, in which a beacon is arranged immediately at a lighting device.

FIG. 1 shows a system 10 with a beacon as a transmission device 12 as well as a communication unit 20 in a schematic block representation. The beacon 12 is arranged immediately at a lighting device 28 and is supplied with electrical energy for the intended operation via the lighting device 28.

The lighting device 28 comprises illuminants not further illustrated for providing a preset illumination function.

Figure 2:
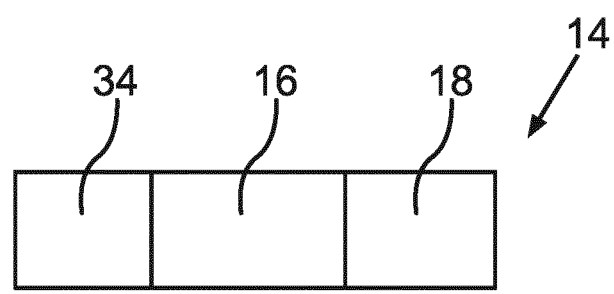
FIG. 2 depicts a schematic representation of a radio signal of the beacon according to FIG. 1.

The beacon 12 is formed to wirelessly transmit a radio signal 14 with identification data 16 specific to the beacon 12 and reference data 18 (FIG. 2). The radio signal 14 is transmitted by the beacon 12 with channel data 18, which presently represents one of multiple radio channels such that it can be identified based on the channel data. Presently, the channel data 18 is a number of that one of the radio channels, via which the radio signal 14 is transmitted.

FIG. 2 exemplarily shows a schematic construction of the radio signal 14, as it is continuously transmitted in intermittent manner in a preset time interval of about 20 milliseconds as a broadcast signal from the beacon 12 via multiple radio channels. The radio signal 14 includes a carrier not illustrated in the manner of an electromagnetic wave with a preset frequency, onto which the corresponding data is modulated by means of a modulation method. Presently, it is provided that a QAM modulation is employed as the modulation method. Modulation methods are fundamentally known to the expert such that a detailed explanation can be omitted at this point.

The data of the radio signal is presently digital data, which is encoded in suitable manner such that the radio signal 14 can be modulated corresponding to the data by means of the modulation method. It is apparent from FIG. 2 that the data comprises a header 34, which is selected typical to the radio signal 14 and allows the communication unit 20 to receive the radio signal 14 by means of a reception unit 26 of the communication unit 20 and to ascertain the beginning of the radio signal to demodulate the radio signal 14 in intended manner. Thereby, the data contained in the radio signal 14 can be ascertained. For this purpose, a suitable decoding can be additionally provided.

As is apparent from FIG. 2, a data area adjoins to the header 34 with specific identification data 16, which has been individually assigned to the beacon 12. Thereby, the beacon 12 can be identified.

The identification data 16 is followed by the channel data 18, which is used by the communication unit 20, as is explained in the following, to allow the communication unit 20 to be able to ascertain the radio channel, via which the radio signal 14 was transmitted.

Presently, it is provided that the communication unit 20 receives the radio signal 14 by means of a reception unit 26 and ascertains the distance using reception-side signal properties and the channel data 18 ascertained from the received radio signal 14. For this purpose, the reception field strength of the radio signal 14 is ascertained as the reception-side signal property. This can be effected by means of the reception unit 26. A first evaluation unit 36 receives a signal corresponding to the reception field strength of the radio signal 14 as well as the channel data 18 ascertained from the radio signal 14 from the reception unit 26. Based on the ascertained channel data 18 and the reception field strength, the distance 22 is ascertained by means of a preset algorithm. The communication unit 20 can use it to ascertain its position with respect to the beacon 12.

The channel data allows ascertaining specific transmission properties of the radio channel, which can be associated with the respective one of the radio channels.

Thereby, it is possible to the communication unit 20 to ascertain a correction factor to be able to more accurately ascertain the distance by means of the correction factor. The channel data 18 allows being able to consider undesired effects on the radio signal 14 in ascertaining the distance.

Besides the above explained data, the radio signal 14 can also include further data if needed.

Presently, the channel data 18 is stored in a storage unit of the beacon 12 not illustrated. A transmission/reception unit 40 is formed to generate the radio signal 14 using the channel data 18 and to transmit it as a broadcast signal 14 via that one of the radio channels, which is associated with the channel data 18.

It has been shown that the radio signal 14 can be impaired, in particular attenuated or also disturbed in channel-specific manner, by environmental influences such that the ascertainment of the distance 22 with the communication unit 20 becomes inaccurate depending on the respective one of the radio channels, via which the radio signal 14 is transmitted, or even can entail an unusable result. Therefore, there is the wish to achieve an improvement here.

As an improvement, the beacon 12 may be configured such that information with respect to the respectively selected one of the radio channels is available.

The beacon 12 transmits the radio signal 14, which is received by the reception unit 26 of the communication unit 20. Here, the reception field strength is ascertained by the communication unit 20 as the reception-side signal property. For the purpose of evaluation, now, the channel data 18 of the radio signal 14 is used. Based on the channel data 18, a second evaluation unit 42, which is presently arranged in the communication unit 20, ascertains transmission data with respect to the ascertained radio channel. The transmission data is used to ascertain a correction factor, which is considered for ascertaining the distance 22.

Hereto, a mathematic formula can be used, which sufficiently reliably describes the physical propagation conditions for electromagnetic waves in the concerned range.

The transmission data required hereto is retrieved by means of a transmission unit 44 of the communication unit 20 and a reception unit 38 of the transmission/reception unit 40 of the beacon 12 via a communication link not further illustrated. The transmission/reception unit 40 receives a query signal of the communication unit 20 with the channel data 18 and communicates the channel-specific transmission data to the communication unit 20 in response, which stores it in a storage unit. Thereby, the transmission data is available in the communication unit 20.

In a modification of the above mentioned embodiment, it can be provided that the channel data 18 is provided via a center 30, which is in communication link with the beacon 12 via a communication link 32. In this case, the beacon 12 only needs a transmission unit, which is formed to transmit the radio signal 14 in channel-specific manner depending on the transmission data. For example, this can be effected via a communication network like the mobile radio network or the like.

Presently, the communication unit 20 is a smart phone, which includes a corresponding app for the purpose of ascertaining the distance 22. Similarly, it is provided that a corresponding app is installed on the smart phone for calibrating the beacon 12.

In the present configuration, it is provided that the beacon 12 of the system 10 is arranged in a housing of the lighting device 28 not further illustrated, whereby the beacon 12 is not readily reachable. Presently, the beacon 12 is formed to use the BLE standard with respect to the transmission of the radio signal 14. Alternatively, a WiFi standard or the like can also be used. Therein, the beacon 12 is configured such that it can be addressed via the communication unit 20. Hereto, both the communication unit 20 and the beacon 12 can include corresponding control units, which can provide a data processing as well as a data storage. However, this is not illustrated in the Figs.

By means of an algorithm for representing the model, formulas for calculating and/or the like, the channel data 18 can be ascertained. This can be effected using data processing.

Further, the communication unit 20 comprises the reception unit 26 as well as the transmission unit 42, which are configured corresponding to the above mentioned communication standard in order that a communication link between the beacon 12 and the communication unit 20 can be established. In a non-limiting embodiment, this can be controlled via an app.

For example, the center 30 can include an external server including a data storage. Insofar, the center 30 can also include data, in particular the transmission data as well as also tables, routines, formulas and/or models, which can serve to ascertain the transmission data.

The reception field strength is measured by the communication unit 20. By means of evaluation in the second evaluation unit 42, the transmission data can be ascertained from the reception field strength and the measured distance 22 using the algorithm. Hereto, it can be provided that according to a first variant, corresponding transmission data is listed in a table depending on the reception field strength and the ascertained distance. Intermediate values can be ascertained by interpolation. According to a second variant, a mathematic calculation function can be provided, in which the corresponding values are substituted to ascertain the transmission data. A third variant can provide that the values for the transmission data can be read from a simulation model. Of course, combinations of the variants or the like can also be provided. The transmission data can be communicated to the beacon 12, which adopts it and uses it in generating and transmitting the radio signal 14.

Thus, transmission devices or beacons in connection with reception devices or communication units are concerned, which can for example be formed by a smart phone, a local Bluetooth transmission unit—reception unit or the like. The transmission device or the beacon uses a plurality of radio channels. Correspondingly, the communication units can also use a plurality of radio channels. The radio signal transmitted by the transmission device or the beacon can have different properties with different radio channels, for example different field strengths, such that inaccuracies can arise in the use by the communication unit, for example in a distance measurement based on transmission power.

A radio technology based on channel can employ multiple different radio channels or radio frequencies in sequential or equally distributed manner, which for example use the same antenna unit of the transmission device and the communication unit, respectively.

Therein, it is shown that a reception power or a reception field strength of the radio signal among other things can be differently severely marked depending on the radio frequency or the channel due to a characteristic of the commonly used antenna unit. The reception field strength as well as also the transmission power of the radio signal emitted by the antenna unit can vary according to channel or frequency. A characteristic of the antenna unit, in particular the dependency of the signal field strength of the radio signal on the frequency or the channel can be dependent by the geometry of the antenna unit and a series of further parameters like the electrics, in particular with respect to the installation position, circuit board tolerances, temperature, air humidity and/or the like. With WLAN, for example 11 to 14 different radio channels can be provided. With Bluetooth, for example 79 different radio channels can be provided. With Bluetooth Low Energy, 40 radio channels can be provided, of which a preset number of radio channels can be used for beaconing and advertisement, respectively. With Bluetooth 5BLE, all of the radio channels or the further 37 radio channels can be used for a so-called secondary advertising (beaconing).

For example, if a signal strength of the radio signal is to be evaluated per transmitting antenna, such as for example in beaconing, in particular for example for range measurements, by the variation of the transmission powers of the radio signal with respect to the different radio channels or carrier frequencies, different results or also fluctuations with respect to the evaluation by the communication unit can be the consequence.

Therein, it proves problematic that information about the used radio channel or the used carrier frequency for the radio signal is for example not necessarily transferred according to the Bluetooth standard. Correspondingly, this information or this data either cannot be accessed on the communication unit side to perform the evaluation on the communication unit side.

In order to improve the use of the radio signal for different purposes of application by the communication unit, according to a first aspect, the transmission device or the beacon communicates the radio signal via multiple radio channels or carrier frequencies to the communication unit. In this configuration, the transmission power does not have to be varied depending on the respective radio channel or the respective carrier frequency on the transmission device side or beacon side. Therein, it is accepted that the different radio channels or carrier frequencies communicate the respective radio signal with a different power or field strength on the transmission device side or beacon side, although the signal can come from a single transmission unit of the transmission device or of the beacon. Of course, the evaluation of the radio signal by the communication unit is thereby adversely affected. The evaluation either cannot be readily improved.

The transmission device or the beacon stores data about which characteristic the transmission device or the beacon has with respect to the transmission of the radio signal depending on the radio channels or the carrier frequencies. Moreover, the transmission device or the beacon transmits channel data by means of the radio signal, which can for example be a data packet, which is transferred by means of the radio signal. Thus, an identifier of the radio channel or the carrier frequency is additionally communicated by means of the radio signal such that on the communication unit side in receiving the radio signal via a respective one of the radio channels, it can also be ascertained at the same time, via which one of the radio channels the radio signal has now been received. Therein, the channel data can only simply be added to the specific identification data of the transmission device or the beacon, which is communicated with the radio signal anyway.

Based on the communicated channel data and the characteristic of the respective antenna unit associated therewith, which is also stored in the communication unit, the communication unit can now perform a more accurate evaluation, in particular with respect to a distance calculation. The communication unit can convert a reception power or a reception field strength of the radio signal into a distance considering the now known radio channel based on the known characteristic or a characteristic curve. Now, it is no longer required to orient oneself to average values of all of the used radio channels.

An advantageous development is in that identical antenna units are used on the transmission device side or beacon side on the one hand and communication unit side on the other hand. Thereby, the respective characteristics of the antenna unit are known on the communication unit side. Since the communication unit side antenna unit characteristic is known, it can be assumed for the evaluation that the same antenna unit characteristic is also present on the transmission device side or beacon side. Thereby, the evaluation can overall be simplified.

It further proves advantageous if the antenna unit has a constant or uniform characteristic such that a dependency on the used radio channels or carrier frequencies is as low as possible, is compensated for.

It can further be provided that the evaluation of the radio signal includes smoothing, which is effected using statistical approaches. For this purpose, multiple radio signals can be recorded over a preset corresponding period of time to be able to improve the evaluation for example with calculation of an average value.

Moreover, there is the possibility that the transmitted radio signal is modified for each radio channel such that the different radio signals can be used on the communication unit side to be able to differentiate or identify the radio channels. This can for example be achieved by different specific identification data, a different transmission address of the transmission device or the beacon and/or the like.

If the transmission device or the beacon only transmits on a single radio channel, the channel data can be transmitted with a scan response. The communication of the channel data to the communication unit can be effected at application levels. For this purpose, the data packet can be provided, which includes the channel data.

The present first aspect can also be referred to as receiver-side smoothing.

A second aspect is based on a transmitter-side smoothing or adaptation or calibration of a transmission power of the transmission device or the beacon. Therein, the adaptation of the transmission power is effected such that the transmitted radio signal has the same transmission power or transmission field strength, if possible, with respect to the different radio channels. For this purpose, the transmission power for each one radio channel can be ascertained related to a constant energy or power of the radio signal considering a constant distance for each one of the radio channels or each one of the carrier frequencies. According to a first variant, this can be effected using a characteristic curve or a known characteristic. According to a second variant, a stationary receiver can be used hereto.

The different channel-specific transmission powers can be stored. Thereby, the different transmission powers are known and can optionally also be calculated. For transmitting the radio signals via the respective radio channels or carrier frequencies, individual routines can be provided. In transmitting a radio signal for example provided for a distance measurement, the radio channels or carrier frequencies now do no longer have to be generated with identical power or energy, but they are now controlled or calibrated to a constant transmission power or transmission field strength of the radio signal. Therein, the following three variants can be differentiated.

According to a first variant, the transmission power or the transmission field strength is adapted based on the characteristic curves and known characteristics such that a constant transmission power or transmission field strength computationally arises for the radio signal.

According to a second variant, the transmission power is for example calibrated in a laboratory such that the radio channels or the carrier frequencies can be individually adapted in a test environment such that a nearly constant transmission power or transmission field strength arises with respect to sequentially proceeding radio channels. The different powers per radio channel or carrier frequency derived therefrom can be stored in a firmware, for example at an application level, and correspondingly retrieved.

According to a third variant, in the environment of the transmission device or the beacon, a communication unit can be arranged in a constant range and in a substantially undisturbed state, which always captures the radio signals over the different radio channels or carrier frequencies and gives feedback in the manner of a control loop to the transmission device or the beacon. Therein, an energy supply or a generator for the radio signal can be regulated with respect to the power to a set value to thereby be able to achieve a nearly constant transmission power or transmission field strength for the radio signal on the side of the transmission device or the beacon.

The embodiments exclusively serve for explaining the invention and are not intended to restrict it.

LIST OF REFERENCE CHARACTERS

10 system
12 transmission device
14 radio device
16 identification data
18 channel data
20 communication unit
22 distance
26 reception unit
28 lighting device
30 center
32 communication link
34 header
36 first evaluation unit
38 reception unit
40 transmission/reception unit
42 second evaluation unit
44 transmission unit

The invention claimed is:

1. A method for operating a lighting device comprising a transmission device, wherein the method comprises:
   wirelessly transmitting a radio signal with identification data specific to the transmission device of the lighting device via at least two radio channels;
   wherein the transmitted radio signal transmitted via a respective one of the at least two radio channels contains channel data with respect to the respective one of the at least two radio channels; wherein the channel data comprises at least one selected from the group comprising:
      a number of the respective radio channel, a carrier frequency of the respective radio channel, at least a part of the transmission properties of the respective radio channel, and a respective channel-specific transmission power of the transmission device.

2. The method according to claim 1,
   further comprising adjusting a transmission power of the radio signal transmitted via the respective one of the at least two radio channels based on transmission properties of the respective radio channel.

3. The method according to claim 1,
wherein the identification data is based on the radio channel, on which the radio signal is transmitted.

4. The method according to claim 1,
wherein the radio signal is transmitted offset in time on the respective one of the at least two radio channels.

5. The method according to claim 1,
wherein the radio signal is channel-selectively transmitted only on a selected one of the at least two radio channels.

6. A method according to claim 1,
further comprising receiving the radio signal transmitted via the at least two radio channels from the transmission device with identification data specific to the transmission device; ascertaining and evaluating reception-side signal properties of the radio signal and the specific identification data contained in the received radio signal;
wherein channel data with respect to the respective radio channel is ascertained from the radio signal and the evaluation is effected based on the channel data.

7. The method according to claim 6,
wherein the radio signal is received via a selected channel of the at least two radio channels.

8. The method according to claim 6,
further comprising storing, in a communication unit, transmission data to transmission properties for the at least two radio channels.

9. A lighting device comprising:
one or more illuminants; and
a transmission device configured to wirelessly transmit a radio signal with identification data specific to the transmission device via at least two radio channels, wherein the transmission device is formed to transmit the radio signal to be transmitted via the respective one of the at least two radio channels with channel data with respect to this respective one of the at least two radio channels; wherein the channel data comprises at least one selected from the group comprising:
a number of the respective radio channel, a carrier frequency of the respective radio channel, at least a part of the transmission properties of the respective radio channel, and a respective channel-specific transmission power of the transmission device.

10. The lighting device according to claim 9, wherein the transmission device is configured to adjust a transmission power of the radio signal to be transmitted via the respective one of the at least two radio channels based on transmission properties of the respective radio channel.

11. A communication unit configured to:
receive a radio signal transmitted via at least two radio channels from a lighting device comprising transmission device with identification data specific to the transmission device;
ascertain and evaluate reception-side signal properties of the radio signal and the specific identification data contained in the received radio signal;
ascertain channel data with respect to the respective radio channel from the radio signal;
wherein the channel data comprises at least one selected from the group comprising:
a number of the respective radio channel, a carrier frequency of the respective radio channel, at least a part of the transmission properties of the respective radio channel, and a respective channel-specific transmission power of the transmission device; and
perform the evaluation based on the channel data and/or to channel-selectively receive the radio signal and to perform the evaluation depending on transmission properties of the selected radio channel.

12. A system with a lighting device according to claim 9.

13. The system according to claim 12,
further comprising a communication unit comprising a communication unit antenna;
and wherein the transmission device comprises a transmission antenna; wherein the communication unit antenna and the device antenna are complementary to each other with respect to their radio-specific antenna properties.

14. The lighting device according to claim 9, wherein the transmission device is a beacon.

15. The method of claim 1, wherein the transmission device is a beacon.

16. The method of claim 1, further comprising determining a distance between the lighting device and a communication unit based on the transmitted radio signal.

17. The method of claim 1, further comprising:
ascertaining a correction factor based on the channel data; and
determining a distance between the lighting device and a communication unit based on the transmitted radio signal and the correction factor.

18. The communication device of claim 11, further configured to determine a distance between the lighting device and the communication device based on the ascertained channel data.

19. The communication device of claim 11, further configured to:
ascertain a correction factor based on the channel data; and
determine a distance between the lighting device and the communication device based on the ascertained channel data and the correction factor.

* * * * *

UNITED STATES PATENT AND TRADEMARK OFFICE
CERTIFICATE OF CORRECTION

PATENT NO. : 11,596,045 B2
APPLICATION NO. : 17/044331
DATED : February 28, 2023
INVENTOR(S) : Christoph Peitz et al.

It is certified that error appears in the above-identified patent and that said Letters Patent is hereby corrected as shown below:

On the Title Page

Item (30) should read as below:
(30) Foreign Application Priority Data
Apr. 4, 2018 (DE) .... 102018107921.4

Signed and Sealed this
Twenty-fifth Day of April, 2023

Katherine Kelly Vidal
*Director of the United States Patent and Trademark Office*